(12) United States Patent
McElhinney et al.

(10) Patent No.: US 9,297,249 B2
(45) Date of Patent: Mar. 29, 2016

(54) METHOD FOR IMPROVING WELLBORE SURVEY ACCURACY AND PLACEMENT

(76) Inventors: Graham A. McElhinney, Inverurie (GB); Leon Ceh, Calgary (CA); Euan Forbes, Calgary (CA); Kenneth Stenerson, St. Albert (CA)

(*) Notice: Subject to any disclaimer, the term of this patent is extended or adjusted under 35 U.S.C. 154(b) by 779 days.

(21) Appl. No.: 13/528,527

(22) Filed: Jun. 20, 2012

(65) Prior Publication Data

US 2013/0002257 A1 Jan. 3, 2013

Related U.S. Application Data

(60) Provisional application No. 61/502,464, filed on Jun. 29, 2011.

(51) Int. Cl.
*E21B 47/022* (2012.01)
*G01V 3/40* (2006.01)

(52) U.S. Cl.
CPC ......... *E21B 47/02224* (2013.01); *E21B 47/022* (2013.01); *G01V 3/40* (2013.01)

(58) Field of Classification Search
CPC . E21B 47/02; E21B 47/022; E21B 47/02216; E21B 47/02224; G01V 3/08; G01V 3/081; G01V 3/087; G01V 3/18; G01V 3/26; G01V 3/40
See application file for complete search history.

(56) References Cited

U.S. PATENT DOCUMENTS

| | | | |
|---|---|---|---|
| 6,021,577 A * | 2/2000 | Shiells et al. | 33/304 |
| 6,179,067 B1 * | 1/2001 | Brooks | 175/45 |
| 6,212,476 B1 * | 4/2001 | Noy et al. | 702/9 |
| 6,227,310 B1 * | 5/2001 | Jamieson | 175/40 |
| 6,508,316 B2 * | 1/2003 | Estes et al. | 175/45 |
| 6,985,814 B2 | 1/2006 | McElhinney | |
| 7,617,049 B2 | 11/2009 | McElhinney et al. | |
| 7,656,161 B2 | 2/2010 | McElhinney | |
| 7,816,922 B2 | 10/2010 | McElhinney | |
| 7,891,103 B2 * | 2/2011 | Mayor et al. | 33/356 |
| 2003/0014873 A1 * | 1/2003 | Towle | 33/304 |
| 2004/0249573 A1 * | 12/2004 | McElhinney | 702/7 |

FOREIGN PATENT DOCUMENTS

EP 793000 A2 9/1997

OTHER PUBLICATIONS

Csontos, Andras, Lsazlo Hegymegi, and Balazs Heilig. "Temperature Tests on Modern Magnetometers." Publications of the Institute of Geophysics. Polish Academy of Sciences, Jun. 25, 2006. Web. Jan. 14, 2015.*

Pariso, J., and H. P. Johnson (1988), A downhole magnetic logging tool for the Ocean Drilling Program, Eos Trans. AGU, 69(35), 818-818, doi:10.1029/88EO01081.*

* cited by examiner

*Primary Examiner* — Cathleen Hutchins
*Assistant Examiner* — Tara Schimpf
(74) *Attorney, Agent, or Firm* — Kimberly Ballew

(57) ABSTRACT

Methods for improving wellbore survey accuracy and placement are disclosed. The Earth's magnetic field may be measured at a magnetically clean surface location and correlated with a non-magnetic reference direction to obtain a direction of the Earth's field (e.g., a magnetic declination or a magnetic inclination). The direction of the Earth's magnetic field may in turn be processed in combination with magnetic measurements made in a subterranean borehole to obtain one or more survey parameters.

8 Claims, 3 Drawing Sheets

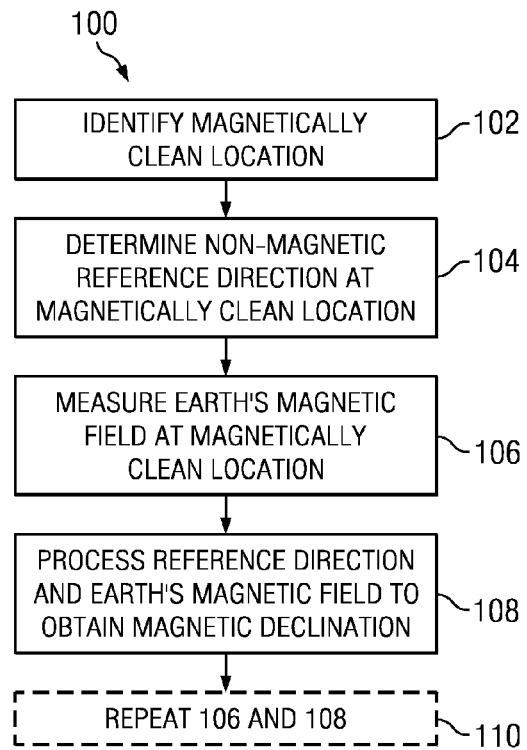
FIG. 1
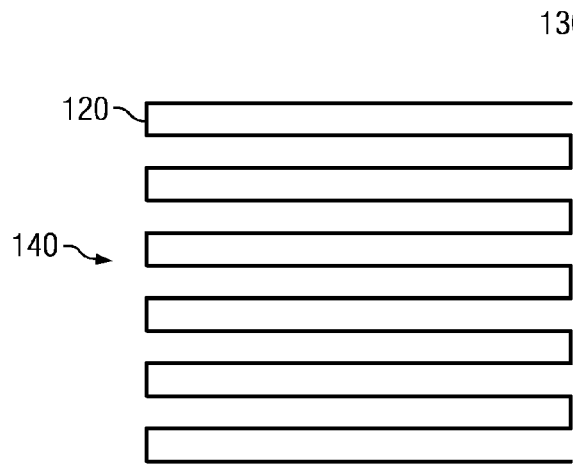
FIG. 2
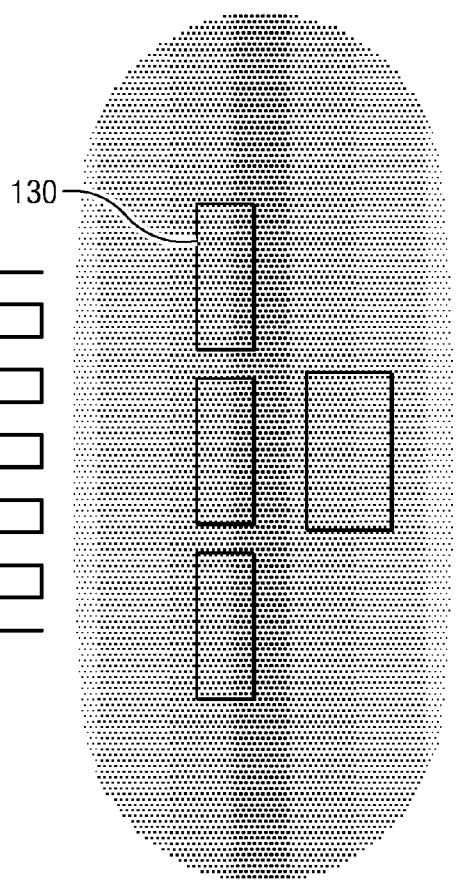

METHOD FOR IMPROVING WELLBORE SURVEY ACCURACY AND PLACEMENT

CROSS REFERENCE TO RELATED APPLICATIONS

This application claims the benefit of U.S. Provisional Application Ser. No. 61/502,464 entitled Method for Improving Wellbore Survey Accuracy and Placement, filed Jun. 29, 2011.

FIELD OF THE INVENTION

Disclosed embodiments relate generally to surveying subterranean wellbores used for oil and natural gas exploration and production. In particular, they relate to a method for improving survey accuracy via an improved measurement of the Earth's magnetic field (e.g., including total magnetic flux, magnetic inclination, magnetic declination).

BACKGROUND INFORMATION

In conventional well drilling operations, surveying measurements are made both during and after drilling. The surveying measurements are used to determine both the orientation and absolute position of the well bore. The wellbore survey is often determined in part from measurements of the Earth's magnetic field in the wellbore. The measured magnetic field may be processed, for example, to determine a borehole azimuth (the direction of the well axis with respect to magnetic north).

Magnetic surveying measurements require that the Earth's magnetic field be known at the drilling location. The accuracy of the survey is limited by the accuracy of this "known" magnetic field. The Earth's magnetic field may be defined as a three dimensional vector, including a magnitude (field strength) and direction (defined, for example, by the magnetic declination and magnetic inclination of the field). Magnetic declination generally refers to the angle between magnetic north and true north. Magnetic inclination (also referred to as magnetic dip) generally refers to the angle of the magnetic field with respect a horizontal plane. The accuracy of the "known" field strength, magnetic declination, and magnetic inclination is directly related to survey accuracy with errors in these parameters resulting in corresponding wellbore orientation and placement errors. The placement errors can be significant (especially in deep wells) as they compound from one survey measurement to the next.

The magnetic field of the Earth (including the magnitude and direction components) is commonly obtained from previous geological survey data and/or global geomagnetic models in combination with suitable interpolation and/or mathematical modeling routines. The historical survey data and geomagnetic models tend to be limited in that they do not account for local magnetic field variations and solar magnetic activity. Solar activity in particular can be significant at high latitudes. Even at low latitudes (e.g., near the equator), the magnetic declination and magnetic inclination estimated using geomagnetic models can have errors approaching one degree. Such errors can result in significant borehole azimuth errors, for example, in a nearly horizontal, east-west wellbore, the magnetic azimuth error can be greater than four degrees. Moreover, these errors tend to be systematic (non-random) and can result in wellbore placement errors on the order of 100 feet or more in deep wells.

Measurement of the Earth's magnetic field at the surface while drilling is generally considered not to be practical or reliable, for example, due to local magnetic interference at the rig site. The oil industry has generally chosen to accept the aforementioned errors and the corresponding poor survey and well placement results. There is clearly a need in the art for obtaining an improved estimate of the Earth's magnetic field so as to facilitate improved magnetic surveying.

SUMMARY

Methods for improving wellbore survey accuracy and placement are disclosed. In one or more of the disclosed embodiments the Earth's magnetic field may be measured at a magnetically clean surface location and correlated with a non-magnetic reference direction to obtain a direction of the Earth's magnetic field (e.g., a magnetic declination or a magnetic inclination). The direction of the Earth's magnetic field may in turn be processed in combination with magnetic measurements made in a subterranean borehole to obtain one or more survey parameters (e.g., a magnetic azimuth with respect to true north or a magnetic interference vector emanating from another subterranean structure).

The disclosed embodiments may provide various technical advantages. For example, disclosed methods tend to improve wellbore survey accuracy and placement as compared to conventional wellbore surveying procedures. Disclosed embodiments may also be utilized to improve the accuracy of subterranean magnetic ranging operations.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

For a more complete understanding of the disclosed subject matter, and the advantages thereof, reference is now made to the following descriptions taken in conjunction with the accompanying drawings, in which:

FIG. 1 depicts a flow chart of one disclosed method embodiment.

FIG. 2 depicts one example of a proton magnetometer scan pattern useful for locating a magnetically clean zone.

DETAILED DESCRIPTION

FIG. 1 depicts a flow chart of method embodiment 100. At 102 a magnetically clean area is identified close to the rig site. This may be accomplished, for example, via a proton magnetometer scan as described in more detail below. A non-magnetic reference direction is then determined in the magnetically clean area at 104. The reference direction may be determined, for example, via global positioning system (GPS) measurements or conventional gyro measurements as is also described in more detail below. At 106, the Earth's magnetic field is measured in the magnetically clean area, for example, using a tri-axial magnetometer package substantially identical to that used in wellbore surveying operations. At 108 the nonmagnetic reference direction determined at 104 and the magnetic field measured at 106 are processed in combination to obtain magnetic declination and magnetic inclination. Steps 104, 106, and 108 (or steps 106 and 108)

may optionally be repeated at substantially any time interval to obtain "real-time" magnetic declination and magnetic inclination as indicated at 110.

The magnetically clean area may be located as close as possible to the rig site (the wellbore site). It is generally feasible to locate such an area within about 50 or 100 meters of rig site equipment and/or containers, although precise distances should be determined on a site to site basis. To locate the clean magnetic area a prospective area is first determined, for example, so as to be located at least a predetermined distance from magnetically hot surface equipment. The prospective area may be scanned with a proton magnetometer, for example, in a raster pattern 120 as indicated on FIG. 2 (e.g., a rectangular scan pattern in which the area is scanned from side to side). A region having no magnetic gradient (e.g., a variation of less than 40 nano tesla in total magnetic flux) may be taken as an indication that a region is magnetically clean. In FIG. 2, containers and various other rig equipment 130 generate magnetic interference (depicted as shading about the rig equipment). The magnetic interference tends to be suitably low at some distance from the equipment, e.g., at location 140.

Figure 3:
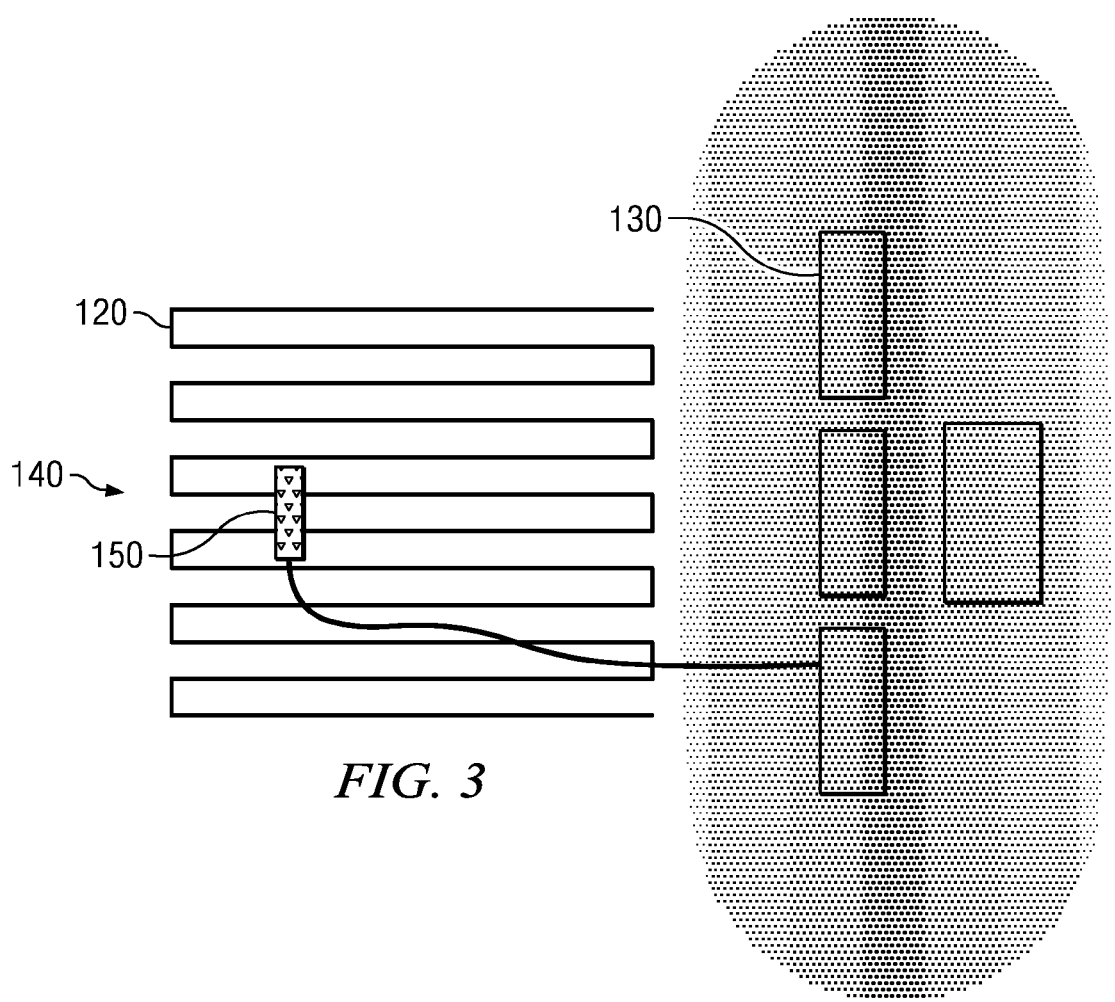
FIG. 3 depicts a probe suitable for measuring a reference direction deployed in the magnetically clean zone.

FIG. 3 depicts the deployment of a magnetic measurement probe (sensor) in the magnetically clean area. In the embodiment depicted, the magnetic field sensor is deployed in a conventional hot box 150 so as to be maintained at a constant temperature in a range from about 25 to about 175 degrees C. (those of ordinary skill in the art will readily appreciate that downhole magnetometers are commonly calibrated for temperatures in the range from 25 to 175 degrees C.). The temperature may also be advantageously controlled so as to match downhole temperatures measured during drilling and surveying operations. The measurement probe may include a tri-axial magnetometer set configured for measuring a three dimensional magnetic field vector and a tri-axial accelerometer set configured for measuring a three dimensional gravitational field vector.

The probe may be deployed in the magnetically clean area such that the z-axes of the magnetometer and accelerometer sets are approximately aligned with the direction of the well being surveyed. For example, for a J-shaped well having a horizontal section, it may be advantageous to align the z-axes with an approximate direction of the horizontal section (e.g., within about 30 degrees in one embodiment or within 10 degrees in another embodiment).

Global positioning measurements may be advantageously utilized to determine the reference direction at 106. For example, a direction may be determined between first and second spaced apart locations using conventional GPS units. The first and second locations may be spaced apart by a distance in the range from about 100 to about 1000 meters, for example, within sight of one another (although the disclosed embodiments are not limited in these regards). A GPS measurement may be made at each location so as to determine the absolute positions of the locations. Coordinate subtraction may then be used to determine the direction between the two positions relative to true north in the Universal Transverse Mercator (UTM) coordinate system.

For example, as is known to those of ordinary skill in the art, GPS coordinates are generally given in units of degrees longitude and degrees latitude. A coordinate subtraction between the first and second GPS measurements results in a change in longitude and a change in latitude (referred to herein as $\Delta\lambda$ and $\Delta\phi$). These changes may be readily converted to conventional distance units (e.g., feet or meters) using known conversions. For example, a nautical mile is defined as being equal to one arc minute of latitude assuming a perfectly spherical Earth (i.e., 60 nautical miles per degree of latitude). Owing to the bulging of the Earth, one arc minute of latitude is known to vary from 1.005 nautical miles at the poles to 0.995 nautical miles at the equator. A one arc minute change in longitude may also be converted to a distance, for example, according to the following mathematical equation:

$$D_{Lo} = N \cdot \Delta\lambda \cdot \cos\phi \qquad \text{Equation 1}$$

where N represents a nautical mile, $\Delta\lambda$ represents the change in longitude in units of arc minutes, and $\phi$ represents the latitude. Those of ordinary skill in the art will readily be able to convert the changes in latitude and longitude to substantially any suitable distance unit (e.g., including feet or meters).

Since the GPS units may be spaced apart by a relatively small distance (e.g., less than 1 km such that the change in longitude and latitude is measured in arc seconds), the curvature of the Earth need not be taken into account when determining the reference direction. The disclosed embodiments are of course not limited in these regards. The GPS reference direction may then be obtained with respect to true north, for example, according to the following mathematical equation:

$$\cot\theta = \frac{D_{Lo}}{D_{La}} \qquad \text{Equation 2}$$

Where $\theta$ represents the reference direction with respect to true north, $D_{Lo}$ represents the longitudinal distance between the GPS sensors, and $D_{La}$ represents the latitudinal distance between the GPS sensors.

To improve the accuracy of the reference direction, the GPS measurements at the first and second locations may be synchronized (i.e., made at substantially the same time). GPS measurements are known to vary slightly with time (e.g., by a few feet) with the variance being the same from one GPS sensor to the next. While the absolute positions measured by the GPS sensors may vary with time, the differences in longitude and latitude between those positions (i.e., the direction between the sensors) will tend to change very little, if at all, with time. Hence the use of synchronized measurements tends to provide a more accurate reference direction.

Prior to making the magnetic field measurement at 106, the magnetic field sensors in the hot box may be aligned with either the reference direction determined at 106 or a direction in which the well bore is being drilled (or is to be drilled). These are commonly the same direction as the reference direction and may be chosen so as to align with a direction of drilling. Typically, the z-axis sensor is aligned with the direction. Such alignment may be accomplished, for example, via aligning the z-axis sensor with a laser guide between the GPS sensors. The z-axis sensor may alternatively be aligned using various sighting devices, for example, including telescopic gun sights. The total magnetic force (TMF) may then be measured as a function of toolface angle while the tri-axial magnetometer set is rotated about the z-axis. For example, eight TMF measurements may be made at 45 degree intervals. The toolface angle of the magnetometer set may then be selected such that the measured TMF most closely matches the TMF value obtained during the proton magnetometer scan. In this way a more accurate TMF measurement may be obtained. The tri-axial magnetic field vector may then be measured using the tri-axial magnetometer at 106.

The aforementioned magnetic field measurements may be advantageously made using a backup magnetometer set.

Those of ordinary skill in the art will readily appreciate that a rig commonly includes a primary magnetometer set and at least one backup magnetometer set. The primary set is deployed downhole in the BHA, while the backup set (being substantially identical to the primary set) is available for use should the primary set fail (or become unusable) in any way.

Those of ordinary skill in the art will further appreciate that the magnetic measurement provides a real-time indication of the direction of magnetic north. This may be compared with the reference direction determined at 104 to determine the magnetic declination. For example, the magnetic declination may be the difference between magnetic north and true north in the reference frame defined by the tri-axial magnetometers.

Moreover, corresponding tri-axial accelerometer measurements may be made substantially simultaneously with the tri-axial magnetometer measurements at 106. The accelerometers measurements enable the horizontal plane to be defined in the local reference frame (the reference frame of the tri-axial magnetometers). The three-dimensional magnetic field vector may then be compared with the horizontal plane so as to determine the magnetic inclination (magnetic dip).

The Earth's magnetic field vector may be advantageously measured at the surface in substantially real-time during a drilling operation so as to obtain a continuously updated measurement of the total magnetic flux, magnetic declination, magnetic inclination (i.e., a full three-dimensional characterization of the magnetic field vector). These measurements may then be advantageously used in various borehole survey operations. For example, a magnetic declination measurement having improved accuracy enables the absolute direction (the azimuth angle with respect to true north) to be determined more accurately.

Moreover, multi-station analysis is commonly used in borehole surveying operations so as to account for BHA magnetic interference (one example of a multi-station analysis methodology is disclosed in European Patent Application EP 0793000 A2). Despite the fact that magnetic surveying packages are commonly installed in a special nonmagnetic section of the drill string, magnetic interference is well known in the art to adversely affect magnetic azimuth determination. Multi-station analysis can be used to account for magnetic interference in the BHA and requires the Earth's magnetic field vector as an input. The improved accuracy of the measured field (including total magnetic flux, magnetic declination, and magnetic inclination) obtained in accordance with the disclosed embodiments is expected to improve the accuracy of the multi-station analysis. Furthermore, the Earth's magnetic field vector may be updated at substantially any suitable time interval while drilling.

The Earth's magnetic field must also be taken into account in magnetic ranging measurements, for example, as used in well twinning and relief well drilling operations. Magnetic ranging measurements are particularly well-suited for steam assisted gravity drainage (SAGD) well twinning operations as disclosed in U.S. Pat. Nos. 6,985,814; 7,617,049; 7,656,161; and 7,816,922 to McElhinney. In these operations the Earth's magnetic field is subtracted from magnetic field measurements to obtain a magnetic interference vector which is presumably the result of magnetic interference emanating from the target well. Improved measurement of the Earth's magnetic field in accordance with the disclosed embodiments is therefore expected to further improve the accuracy of well twinning operations that make use of magnetic ranging measurements.

Disclosed methods may also be used to calibrate the primary and backup magnetometer sets to one another. For example, steps 106 and 108 of method 100 (FIG. 1) may be repeated for the primary and backup magnetometer sets prior to deploying the primary set in the borehole. Moreover, this calibration may further include various roll tests in which each of the magnetometer sets is rotated about at least one of its x-, y-, and/or z-axes or about the reference direction obtained at 104, a horizontal axis orthogonal to the reference direction, and a vertical axis (also orthogonal to the reference direction). Magnetic field measurements may be made at some angular interval (e.g., 45 degrees) during these roll tests and the results input into a multi-station analysis program to determine the precise orientation of each magnetometer in the tri-axial set as well as the relative orientation of each magnetometer with respect to the corresponding magnetometer in the other set (i.e., the precise orientation of the primary magnetometers with respect to the magnetometers in the backup set). The primary and backup magnetometer sets may also be calibrated with a proton magnetometer scan so as to obtain highly accurate total magnetic flux measurements.

Such calibration of the primary and backup magnetometer sets is expected to provide for highly accurate and precise borehole surveying measurements. By accurate it is meant that the measured borehole inclination and borehole azimuth measurements are expected to have a low systematic error (e.g., less than 0.1 degree or possibly even less than 0.01 degree). By precision it is meant that the measured borehole inclination and azimuth measurements are expected to have a low random error. The improved accuracy and precision is expected to provide MWD surveying measurements with greater quality than even wireline gyroscopic surveys in certain drilling applications.

Figure 4:
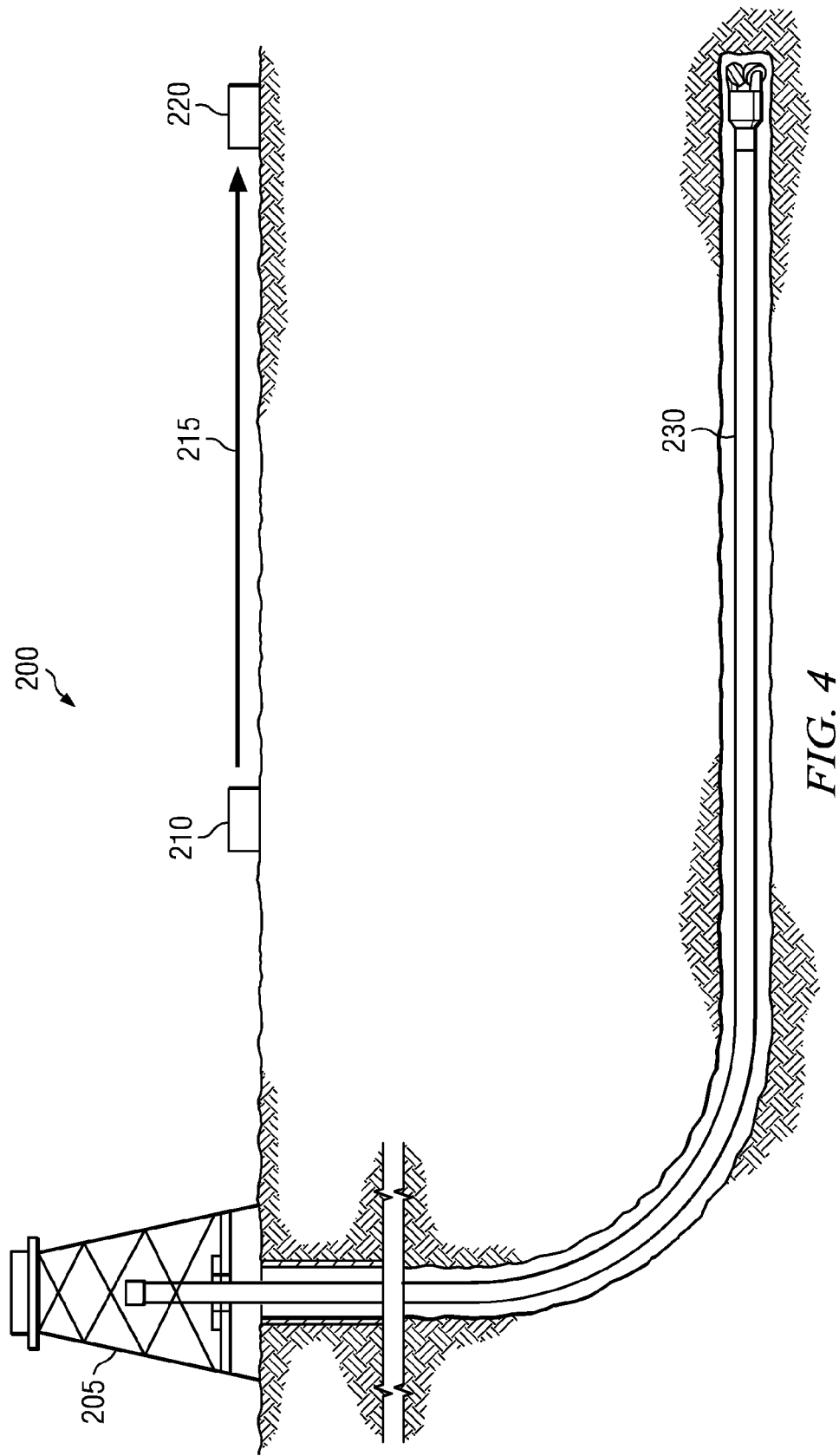
FIG. 4 depicts one example of a drilling operation making use of disclosed surveying methods.

FIG. 4 depicts one example of a drilling operation 200 making use of disclosed surveying methods (e.g., method embodiment 100 depicted on FIG. 1). First and second spaced apart surface stations 210 and 220 are located in close proximity to drilling rig 205. Each of the surface stations includes a conventional GPS unit for making global positioning measurements at the corresponding stations. A reference direction 215 may be obtained by making simultaneous global positioning measurements and a line of sight measurement between the two surface stations 210 and 220 (as described above). At least one of the surface stations includes a magnetic field sensor, for example, a tri-axial sensor arrangement. In one embodiment, both a z-axis magnetic field sensor and the reference direction 215 may be substantially aligned with a portion of the subterranean borehole 230.

In one non-limiting embodiment, a surveying method is disclosed, comprising: (a) obtaining a non-magnetic reference direction at a magnetically clean surface location; (b) measuring a magnetic field of the Earth at the magnetically clean surface location; and (c) processing the reference direction obtained in (a) and the magnetic field of the Earth measured in (b) to determine a direction of the Earth's magnetic field.

In another non-limiting embodiment, a surveying method is disclosed, comprising: (a) obtaining a first global positioning measurement at a first surface location; (b) obtaining a second global positioning measurement at a second surface location; (c) processing the first and second global positioning measurements obtained in (a) and (b) to determine a reference direction between the first and second surface locations; (d) measuring a magnetic field of the Earth at the first surface location; and (e) processing the reference direction obtained in (c) and the magnetic field of the Earth measured in (d) to determine at least one of a magnetic declination and a magnetic inclination of the Earth's magnetic field.

In a further example embodiment, a method for surveying a subterranean borehole is presented, the method comprising:

(a) obtaining a first global positioning measurement at a first surface location; (b) obtaining a second global positioning measurement at a second surface location; (c) processing the first and second global positioning measurements obtained in (a) and (b) to determine a reference direction between the first and second surface locations; (d) measuring a magnetic field of the Earth at the first surface location; (e) processing the reference direction obtained in (c) and the magnetic field of the Earth measured in (d) to determine at least one of a magnetic declination and a magnetic inclination of the Earth's magnetic field; (f) measuring a magnetic field in the subterranean borehole; and (g) processing the magnetic field measured in (f) with at least one of the magnetic declination and the magnetic inclination of the Earth's magnetic field determined in (e) to obtain at least one of a magnetic azimuth of the subterranean borehole with respect to true north and an interference magnetic field emanating from another subterranean borehole.

Although methods for improving wellbore surveying accuracy and placement and their advantages have been described in detail, it should be understood that various changes, substitutions and alternations can be made herein without departing from the spirit and scope of the disclosure as defined by the appended claims.

What is claimed is:

1. A surveying method comprising:
   (a) using a proton magnetometer to scan a prospective area and identify a magnetically clean surface location;
   (b) obtaining a first and second global positioning measurements at corresponding first and second surface locations, the first surface location being the magnetically clean surface location identified;
   (c) processing the first and second global positioning measurements obtained to determine a reference direction between the first and second surface locations;
   (d) aligning one axis of a tri-axial magnetic field sensor with the reference direction;
   (e) rotating the magnetic field sensor about the axis aligned with the reference direction;
   (f) measuring a total magnetic force of the Earth at the first surface location while rotating the magnetic field sensor;
   (g) selecting a tool face angle of the magnetic field sensor at which the total magnetic force measured is substantially equal to a total magnetic force value for the first surface location obtained using the proton magnetometer;
   (h) measuring a magnetic field vector of the Earth at the first surface location using the magnetic field sensor oriented at the toolface angle selected; and
   (i) processing the reference direction obtained and the magnetic field vector of the Earth measured to determine at least one of a magnetic declination and a magnetic inclination of the Earth's magnetic field.

2. The surveying method of claim 1, wherein the first and second global positioning measurements made are synchronized.

3. The surveying method of claim 1, wherein the magnetic field of the Earth is measured using the tri-axial magnetic field sensor deployed in a hot box configured to maintain sensor temperature at a constant temperature in a range from about 25 to about 175 degrees C.

4. The surveying method of claim 1, wherein the first and second surface locations are spaced apart by a distance in a range from about 100 to about 1000 meters.

5. The surveying method of claim 1, wherein the reference direction is determined by subtracting the first global positioning measurement from the second global positioning measurement.

6. The surveying method of claim 1, further comprising:
   (j) measuring a magnetic field in the subterranean borehole; and
   (k) processing the magnetic field measured with at least one of the magnetic declination and the magnetic inclination of the Earth's magnetic field determined to obtain at least one of a magnetic azimuth of the subterranean borehole with respect to true north and an interference magnetic field emanating from another subterranean borehole.

7. A method for surveying a subterranean borehole, the method comprising:
   (a) obtaining a first global positioning measurement at a first surface location;
   (b) obtaining a second global positioning measurement at a second surface location;
   (c) processing the first and second global positioning measurements obtained to determine a reference direction between the first and second surface locations, wherein the first and second locations are selected such that the reference direction and a predetermined section of the subterranean borehole are aligned within about 10 degrees of one another;
   (d) measuring a magnetic field of the Earth at the first surface location using a tri-axial magnetic field sensor of which one axis is substantially aligned with the reference direction determined;
   (e) processing the reference direction obtained and the magnetic field of the Earth measured to determine at least one of a magnetic declination and a magnetic inclination of the Earth's magnetic field;
   (f) measuring a magnetic field in the subterranean borehole; and
   (g) processing the magnetic field measured with at least one of the magnetic declination and the magnetic inclination of the Earth's magnetic field determined to obtain at least one of a magnetic azimuth of the subterranean borehole with respect to true north and an interference magnetic field emanating from another subterranean borehole.

8. The method of claim 7, wherein the predetermined section of the subterranean borehole is substantially horizontal.

* * * * *